United States Patent [19]

Hans et al.

[11] Patent Number: 4,511,192
[45] Date of Patent: Apr. 16, 1985

[54] SUPPORT FOR A TENSION ROLLER

[75] Inventors: Rüdiger Hans, Niederwerrn; Manfred Brandenstein, Eussenheim, both of Fed. Rep. of Germany

[73] Assignee: SKF Kugellagerfabriken GmbH, Schweinfurt, Fed. Rep. of Germany

[21] Appl. No.: 520,830

[22] Filed: Aug. 5, 1983

[30] Foreign Application Priority Data

Aug. 14, 1982 [DE] Fed. Rep. of Germany ... 8222967[U]

[51] Int. Cl.³ .......................................... F16C 35/06
[52] U.S. Cl. ................................................. 384/543
[58] Field of Search ................ 308/187.1, 187.2, 190, 308/191, 208, 209

[56] References Cited

U.S. PATENT DOCUMENTS 4,265,181 5/1981 Schreyer et al. .................... 308/190
4,379,600 4/1983 Müller ............................. 308/187.1

FOREIGN PATENT DOCUMENTS 8120032 7/1981 Fed. Rep. of Germany .

Primary Examiner—Lenard A. Footland
Attorney, Agent, or Firm—Daniel M. Rosen

[57] ABSTRACT

A support for a tension roller is comprised of two cup-shaped sleeves, oriented with their open ends in the same direction, and with an inner one of the cup-shaped sleeves extending into the other of the cup-shaped sleeves. The outer end of the inner cup-shaped sleeve is outwardly flanged, to define a clamp between the flange and the open end of the other cup-shaped sleeve for holding the inner ring of the tension roller bearing. The bottoms of the two cup-shaped sleeves are initially spaced, and are drawn together upon tightening of a mounting screw extending therethrough into a machine frame, in order to clamp the inner bearing ring between the flange and the open end of the other cup-shaped sleeve.

6 Claims, 1 Drawing Figure

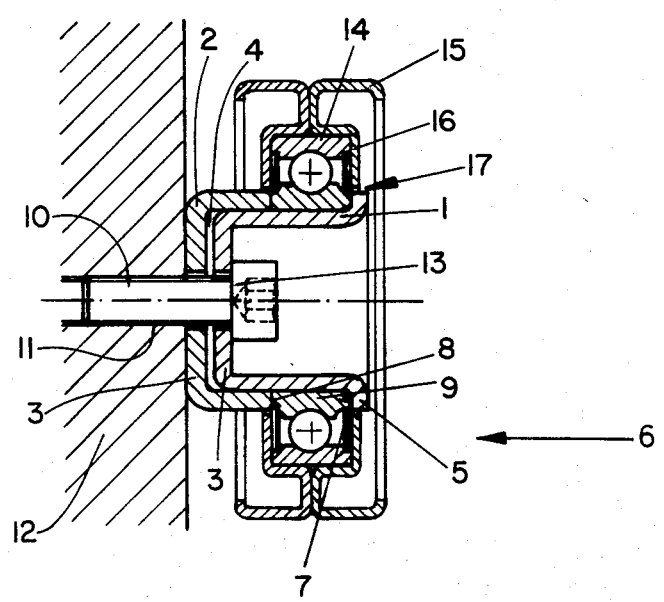

SUPPORT FOR A TENSION ROLLER

This invention relates to a support for a tension roller, and is particularly directed to a support arrangement comprised of two coaxial cup-shaped sleeves with open ends, the cup-shaped sleeves extending axially in the bearing of the tension roller and having mounting holes in their bottom surfaces.

A support of this type is disclosed, for example, in DE-GM No. 81 20 032. The inner cup-shaped sleeve of this reference is provided with a radially directed annular bulge in the region of the transition of the cylindrical section and the bottom. The bearing of the tension roller is clamped between this bulge and the edge of the other cup-shaped sleeve. Although this arrangement provides fixed axial clamping, under extreme radial forces the tension roller can exhibit small deflections or tipping, since the edge regions of the two cup-shaped sleeves are inserted in one another. The greatest danger of elastic yielding exists at these positions. If a bearing seal is provided on the roller, in addition to the usual bearing seal, then a problem may arise since, due to the formation of the bulge, a slightly convex often not exactly circular outer surface results, and such a surface has only a limited suitability for a running surface of the seal. In addition, this arrangement is not always suitable for use in narrow spaces, since in the above arrangement, for example, the head of a tension or mounting screw extends axially beyond the side of the tension roller.

It is therefore the object of the invention to provide a support of the above type which provides a radially stronger mounting and an improved seal of the bearing, in comparison with the above known arrangement.

Briefly stated, this object is achieved by providing an arrangement wherein the cup-shaped sleeves are arranged with their open ends facing the same direction, one cup-shaped sleeve extending into the other, and the inner cup-shaped sleeve having a radially outwardly directed flange.

As a consequence, the entire tension roller has improved radial stiffness. The edge region of the outer cup-shaped sleeve is supported by the stiff bottom of the inner cup-shaped sleeve in the region of its open end, and the flange of the inner sleeve provides good stiffening for the edge of the inner cup-shaped sleeve on its outer end. Furthermore, the outer surface of the flange forms an ideal sliding surface for the running of a seal, or a uniform gap width when a gap seal is employed. Moreover, this flange can be reworked in final machining steps, for special cases, without disadvantageously influencing the rigidity of the flange. As a further advantage, the support of the present invention enables the use of a relatively short mounting screw, the head of the mounting screw being arranged within the inner space of the inner cup-shaped sleeve, so that no additional overall extension of the tension roller results.

In accordance with a further feature of the invention, the bottoms of the cup-shaped sleeves are separated from one another by a gap of the size of the clamping distance for the bearing.

This arrangement enables an especially rigid support. The gap is formed to have exactly such a width that the bottoms of the two cup-shaped sleeves come into engagement with one another upon the tightening of the mounting screw, so that the bearing is clamped between the end of the outer cup-shaped sleeve and the flange of the inner cup-shaped sleeve with a predetermined axial force, when the bottoms of the sleeves are forced together.

In a further embodiment of the invention, the flange of the inner cup-shaped sleeve has the same outer diameter as the outer cup-shaped sleeve. This arrangement is useful especially for a bearing having seals on both sides, since consequently the same seals can be used on both sides of the bearing, with the corresponding sealing surfaces having the same diameter.

In order that the invention will be more clearly understood, it will now be disclosed in greater detail with reference to the single FIGURE of the drawing, which is a longitudinal cross-sectional view of a tension roller having a support in accordance with the invention.

The single FIGURE of the drawing illustrates a tension roller having a support comprised of two cup-shaped sleeves 1,2. The cup-shaped sleeves 1, 2 are so aligned with one another that their two open ends are directed in the same direction and their bottoms 3 are separated from one another by a gap 4. The outer edge of the inner cup-shaped sleeve 1 is radially outwardly bent, to provide a flange 5. The outer diameter of the flange 5 corresponds to that of the outer cup-shaped sleeve 2. A ball bearing 6 is mounted on the outer surface of the inner cup-shaped sleeve 1, the bearing being arranged between the side surface 7 of the flange 5 of the inner cup-shaped sleeve 1 and the end surface 8 of the rim of the outer cup-shaped sleeve 2.

In the illustrated arrangement, the side surfaces of the inner ring 9 of the ball bearing 6 initially loosely abut the flange 5 of the inner cup-shaped sleeve and the end surface 8 of the outer cup-shaped sleeve, so that a gap 4 of predetermined width is provided between the bottom surface of the two cup-shaped sleeves. Upon tightening of a mounting screw 10 the inner cup-shaped sleeve 1 is pulled into the outer cup-shaped sleeve 2, so that the inner ring 9 of the ball bearing 6 is clamped between the end surface 8 and the flange 5, and the bottoms 3 of the two cup-shaped sleeves abut one another. The gap preferably has a width substantially equal to the clamping range, i.e., the distance of relative movement of the sleeves required to clamp the bearing ring. As a consequence, a determinable axial clamping force for the ball bearing 6 results. A mounting screw 10 is positioned to engage the threads 11 in a machine frame 12 or the like, so that the entire tension roller arrangement is affixed to the machine frame at the same time. The head 13 of the mounting screw 10 is positioned within the inner space of the inner cup-shaped sleeve 1, and does not extend axially beyond the cup-shaped sleeve 1. A two part roller surface 15 is mounted on the outer ring 14 of the ball bearing 6, the two parts of the roller surface extending radially inwardly on both sides of the ball bearing 6, with annular radial sections 16, the sections 16 extending inwardly to define an annular gap 17 at the surface of the outer cup-shaped sleeve 2, on one side, and at the flange 5 on the other side. As a consequence, the ball bearing 6 is sealed on both sides.

While the invention has been disclosed and described with reference to a single embodiment, it will be apparent that variations and modifications may be made therein, and it is therefore intended in the following claims to cover each such variation and modifications as follows within the true spirit and scope of the claims.

What is claimed is:

1. In a tension roller having a support comprised of two coaxial cup-shaped sleeves mounted with one inside of the other and extending axially in a bearing of a tension roller, the cup-shaped sleeves having an open end and being provided with the mounting holes in their bottoms, and a bearing held by said cup-shaped sleeves, the improvement wherein the cup-shaped sleeves are positioned with one cup-shaped sleeve extending into the other and with their bottoms extending in the same direction, the inner cup-shaped sleeve having a radially outwardly directed flange on its open end axially engaging and holding one axial side of said bearing.

2. The tension roller of claim 1, wherein the bottoms of the cup-shaped sleeves engage one another and the bearing is held between the flange and open end of the outer sleeve with a predetermined axial device.

3. The tension roller according to claim 1, wherein the flange of the inner cup-shaped sleeve has the same diameter as the outer cup-shaped sleeve.

4. The tension roller of claim 1, wherein said bearing comprises a rolling bearing having an inner ring clamped between said flange and the open end of the other cup-shaped sleeve.

5. The tension roller of claim 4, further comprising a roller surface member mounted on an outer ring of said rolling bearing and extending radially inwardly to define a seal with said flange.

6. The tension roller of claim 5, wherein said roller surface member has a portion extending radially inwardly to define a seal with the outer surface of said other cup-shaped sleeve.

* * * * *